Patented Aug. 13, 1929.

1,724,465

UNITED STATES PATENT OFFICE.

RUDOLF ENGELS, OF HAMBURG, GERMANY, ASSIGNOR TO C. H. F. MÜLLER, RÖNTGEN-RÖHRENFABRIK, OF HAMBURG, GERMANY, A CORPORATION OF GERMANY.

PROCESS OF FUSING METALLIC BODIES TO GLASS AND THE COMBINATION OF METALS USED IN SAID PROCESS.

No Drawing. Application filed February 25, 1926, Serial No. 90,692, and in Germany January 30, 1926.

My invention relates to improvements in the process of fusing metallic bodies to glass and the combination of metals used in the said process. My invention is particularly valuable for use in fusing metallic parts such as cylindrical electrodes to vacuum tubes. As is well known to those skilled in the art it has recently been proposed to fuse tubular electrodes to Röntgen-tubes by means of copper in lieu of platinum, the said copper being adapted to be fused to the glass in a tight manner by means of a very hot flame and under reducing conditions. In view of the low melting point of copper such fusing must be carried out with great care and skill, and it is impossible to fuse copper by machinery.

The object of the improvements is to provide a process by means of which oxidizable metals and glass may be fused without any difficulty and by mechanical means, and with this object in view my invention consists in first coating the metallic body consisting for example of iron, copper, molybdenum, etc., or of alloys, at the part where it is to be fused to the glass, with a thin layer of a protective medium such for example as aluminium, having the function to produce, when heated to fusing temperature, a layer preventing the access of air to the metal. When using the aluminium as a protective layer, an alloy of the said aluminium and the fusing metal is produced at the surface of the said metal, and the said alloy is oxidized to a certain extent by the action of the heat. The melting point of the oxids of aluminium being above 2000° C., the thin layer of the said oxids affords a very effective medium preventing oxidation of the metallic body which is otherwise subject to oxidation.

The thin layer of aluminium or similar medium may be produced in different ways. For example, I produce the same on the metal by electrolytic methods or by throwing thin particles of the metal of the medium against the metal to be coated. The preferred method of applying the surface layer to the metal consists in coating the metal with aluminium lacquer, the binding medium of the said lacquer being burnt by the fusing heat, so that only a thin layer of aluminium remains on the metallic body, which layer is in part oxidized.

An important feature of my improved fusing medium consists in that the coating of aluminium of the fused metallic body prevents corrosion of the coated parts of the metallic body. For example, in Röntgen or radio transmitter tubes the watercooled electrodes are protected as against rusting, and in the case of rectifiers the electrodes exposed to vapors of mercury are protected against amalgamation.

My improved process is adapted for fusing metallic bodies in the form of caps or rings to glass. Further, it is available for fusing wires made from oxidizable metal or metal alloys to glass. Further, seamless drawn steel tubes may be fused in an absolutely tight manner to glass by machinery. By means of my improved process I am enabled to fuse wires of oxidizable metal alloys to glass, which heretofore could not be fused to glass.

I claim:

1. The method of fusing metal to glass, which consists in coating the metal at the part to be fused with a layer of aluminium, and fusing the metal to the glass.

2. The method of fusing metal to glass, which consists in coating the metal at the part to be fused with a lacquer containing aluminium, and fusing the metal to the glass.

3. The combination of an electrode of oxidizable metal adapted to be fused to a vacuum tube of glass, and a surface layer containing aluminum on said electrode at the point to be fused.

4. The combination of an electrode of oxidizable metal adapted to be fused to a vacuum tube of glass, and a surface layer consisting of a lacquer containing aluminum, on said electrode at the point to be fused.

In testimony whereof, I hereunto affix my signature.

RUDOLF ENGELS.